Figure 1:
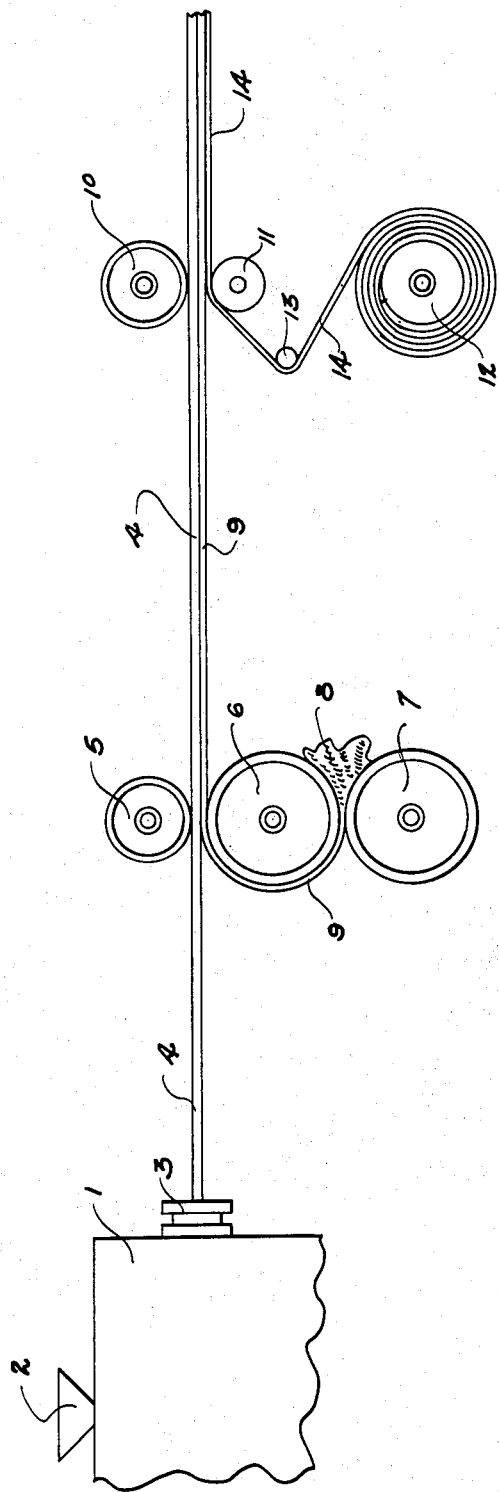

May 8, 1956  L. J. ANDY ET AL  2,744,849
METHOD OF BACKING CAMELBACK
Filed July 15, 1952

INVENTORS
Louis J. Andy
BY and Joseph Andy
William J. Ruano
ATTORNEY

United States Patent Office 2,744,849
Patented May 8, 1956

2,744,849

METHOD OF BACKING CAMELBACK

Louis J. Andy and Joseph Andy, Washington, Pa., assignors of fifty per cent to Patsy Andy and Bennie Andy, both of Washington, Pa.

Application July 15, 1952, Serial No. 298,971

1 Claim. (Cl. 154—102)

This invention relates to the manufacture of tread units or so called camelback for recapping pneumatic tires after the tire tread has worn away.

The conventional method of making camelback is to extrude hot camelback into strip form and cool it in a bath of water to about room temperature, aided with a fan to evaporate the water, then to apply rubber cement in cold condition, and a layer of cushion gum on the cement, and finally to adhere to the cushion gum, while still in cold condition, a backing layer such as plastic coated cloth.

An outstanding disadvantage of such conventional method is that the resulting camelback often fails when in use as the result of separation of the cushion gum from the camelback. Also the backing material tends to separate from the cushion gum during initial handling or molding of the camelback therefore exposing the cushion gum to dirt and moisture in the atmosphere thus detracting from its adhering qualities. The loose adherence of the backing layer is caused not only by the cold adhering process but by entrapping of air therein as the backing layer is adhered to the cushion gum.

An object of this invention is to provide a novel method of making camelback which will assure a strong bond between the camelback, cushion gum and backing layer, which bond will be maintained throughout the entire shop life of the camelback and during molding.

A more specific object of this invention is to provide an improved cushion gum and backing layer for camelback which is free of trapped air, dirt, moisture or other non-adhering matter and which has an amazing strong bond between layers which will obviate separation of the cushion gum from the camelback even after hard and long usage and wear of the camelback.

Other objects and advantages of the invention will become aparent from a study of the following description taken with the accompanying drawing wherein:

The figure is a side elevational view, somewhat schematic, showing the method of forming multi-layer camelback embodying the principles of the invention.

Referring more particularly to the drawing, numeral 1 denotes an extruding or tubing machine of conventional design including a hopper portion 2, through which a rubber compound may be introduced into the machine, and a die 3. The compound may contain up to ½ crude rubber and the balance synthetic rubber. The rubber compound is forced out of the machine through die 3 in the form of an elongated strip or sheet 4 of suitable width, such as from 4 to 20 inches.

Strip 4 while still in heated condition from tuber 1 is passed through a set of calendar rollers comprising a stitching roller 5 of conventional design, such as a stack of discs with holes larger than the driving shaft so that the discs may individually yield, a roller 6 and a roller 7. The linear speed of sheet 4 may be between 5 to 80 feet per minute, preferable about 40 feet per minute. A bank of gum 8 is fed between rollers 6 and 7 and calendered thereby into the form of a thin sheet 9 of so called cushion gum. The sheet is preferably between .005 and .125 inch in thickness. Roller 6 is heated preferably internally by any suitable heating means, such as electrical heaters, gas burners or the like, to a temperature of between 125° and 240° F. to insure strong adherence and a permanent bond between the cushion gum sheet and camelback strip 4 as the strip and gum sheet are stitched by rollers 5 and 6. A temperature of about 180° F. is found to be a somewhat optimum temperature. Immediately after stitching, the sides of sheets 4 and 9 may be trimmed to the desired width by adjustable cutter knives (not shown) in a well known manner.

After cushion gum sheet 9 is adhered to the endless sheet of camelback 4 in the presence of heat and by means of stitcher roller 5 it is passed through a second set of rollers comprising a stitching roller 10, which may be similar to roller 5, and a solid roller 11 of substantially smaller diameter than roller 10 and preferably about 1 or 1½ inches in diameter as compared to roller 10 which may be from four to six inches.

A feed roll 12 has spirally wound thereon a backing material 14, preferably a plastic material such as polyethylene which is guided by a guide roller 13 onto roller 11 between the latter and stitching roller 10 so as to stitch or adhere the backing material or sheet 14 to the cushion gum sheet 9 while the latter is still at an elevated temperature of about 125° to 240° F. The backing sheet is adhered only sufficiently to permit it to be stripped off easily afterwards. By virtue of the relatively small diameter of roller 11 the guide roller 13 may be positioned so as to feed backing sheet 14 at a substantial angle, and the order of 45° and up to about 75°, with sheet 9 and thus avoid the possibility of entrapment of air between sheets 9 and 14 and entry of water which causes separation durring molding.

If roller 11 were of conventional size, that is comparable to that of roller 10 the approach angle of sheet 14 would be very small so that sheet 14 would approach parallelism with sheet 9 and thus tend to accumulate air pockets between sheets 9 and 14 as they come together just before stitching.

After the backing sheet 14 has been stitched to the cushion gum sheet 9 in the presence of heat there results the finished camelback having a strongly adhered cushion gum sheet 9 and backing sheet 14. The finished camelback may be then passed into a water bath to cool it to packaging temperatures of between 100° and 125° F. and cut in desired lengths and packed.

Thus it will be seen that we have provided an efficient method for securely bonding a sheet of cushion gum to camelback and a sheet of backing material to the cushion gum in the presence of heat and by stitching so as to provide an amazingly strong bond providing fusion between layers and preventing weakly bonded surfaces that otherwise separate after hard use of the tire and cause failure.

While we have described a specific method for carrying out our invention it will be understood that this is merely by way of illustration only, and that various changes in materials used, temperatures etc. may be made within the contemplation of the present invention and within the scope of the following claim.

We claim:

The method of forming a camelback strip for recapping pneumatic tires, comprising extruding a heated rubber tread-forming compound into the form of an elongated sheet, calendering a mass of cushion gum into the form of a relatively thin sheet thereon as a layer in the presence of heat in the range of between 125° and 240° F. whereby said sheets are heat-laminated and firmly adhered together, and finally, while still heated to a temperature within said range, passing said sheets through a stitching roller and a solid roller of diameter several times smaller than that of the stitching roller and simultaneously introducing, through said rollers, a sheet of polyethylene which is adhered onto the outer surface of said cushion gum sheet while disposed at an angle of between 45° and 75° with respect thereto to prevent entrapment of air and while the latter is still at elevated temperature.

References Cited in the file of this patent

UNITED STATES PATENTS

| | | |
|---|---|---|
| 1,503,701 | Morton et al. | Aug. 5, 1924 |
| 1,611,400 | Andrews | Dec. 21, 1926 |
| 1,913,330 | Brickman | June 6, 1933 |
| 2,541,498 | Calvert | Feb. 13, 1951 |
| 2,543,229 | Chapman | Feb. 27, 1951 |
| 2,607,712 | Sturken | Aug. 19, 1952 |
| 2,648,487 | Linda | Aug. 11, 1953 |
| 2,649,134 | Steinle | Aug. 18, 1953 |

OTHER REFERENCES

Modern Plastics article entitled "Enter Polyethylene—Exit Holland Cloth," published January 1950, page 124.